United States Patent [19]
Shigesada et al.

[11] Patent Number: 5,389,147
[45] Date of Patent: Feb. 14, 1995

[54] CLEANING METHOD AND APPARATUS FOR APPLICATION-EDGE SURFACES

[75] Inventors: Keiji Shigesada; Akihiro Suzuki; Norio Shibata, all of Kanagawa, Japan

[73] Assignee: Fuji Photo Film Co., Ltd., Kanagawa, Japan

[21] Appl. No.: 935,158

[22] Filed: Aug. 26, 1992

[30] Foreign Application Priority Data

Aug. 29, 1991 [JP] Japan ............... 3-076239[U]
Jul. 13, 1992 [JP] Japan ............... 4-207063

[51] Int. Cl.6 ............................ B05C 11/08
[52] U.S. Cl. ......................... 118/70; 118/319
[58] Field of Search ............. 118/52, 56, 316, 319, 118/70

[56] References Cited
U.S. PATENT DOCUMENTS 4,033,288 7/1977 Woellhaf et al. ............... 118/52
4,073,262 2/1978 Scheffel et al. ............... 118/52

Primary Examiner—Frank Spear
Attorney, Agent, or Firm—Sughrue, Mion, Zinn, Macpeak & Seas

[57] ABSTRACT

An apparatus for automatically cleaning surfaces of an application apparatus is disclosed. The invention is characterized in that it includes a basement extending in parallel with the longitudinal direction of an application apparatus used to apply a magnetic dispersion liquid to a flexible carrier, a tracer movable on the basement, a traverser which can be moved from the tracer to a position over the edge surfaces of the application apparatus and be moved vertically relative to the surfaces, and a cleaning head coupled to the traverser at the end portion thereof so that the head can be placed in elastic contact with the edge surfaces.

9 Claims, 4 Drawing Sheets

CLEANING METHOD AND APPARATUS FOR APPLICATION-EDGE SURFACES

BACKGROUND OF THE INVENTION

The present invention relates to an apparatus for and method for cleaning the application-edge surface of a liquid application apparatus that is used for applying a magnetic dispersion liquid to a flexible carrier. More particularly, the invention relates to an apparatus for cleaning the application-edge surfaces of an extrusion-type application apparatus, a blade-type application apparatus, or the like.

A magnetic dispersion liquid is conventionally applied to a flexible carrier made of polyethylene terephthalate in manufacturing a magnetic tape or disk intended for use as an information recording medium. An extrusion-type or blade-type application apparatus is often used to apply the dispersion liquid to the carrier. When the application process is continually performed, residual magnetic dispersion liquid or contaminants on the carrier tend to be collected and accumulated on the application-edge surfaces of the metering and/or smoothing member of the extrusion-type or the blade-type application apparatus. This contamination adversely affects the quality of the surface of the magnetic dispersion liquid applied to the carrier because the quality of the surface of the magnetic layer applied to the carrier is degraded with streaks or scratches caused by the extraneous substance or with spots caused by the substance itself transferred to the carrier.

Conventionally, the edged surface of the metering or smoothing member is manually wiped away to remove the extraneous substance. However, manual wiping is low in efficiency and adds to the downtime of the application operation, thereby lowering the productivity of the application process. In addition, the manual cleaning operation requires that the person who performs the wiping be highly skilled so as to not damage the edge surfaces. Any damage to the edge surface causes serious damage to the surface of the magnetic layer. Moreover, the clean level by the manual wiping varies from person to person, i.e., the wiping is not likely to be consistent. If the magnetic dispersion liquid is applied to the flexible carrier when the application-edge surfaces remain contaminated with foreign matter, the frequency in occurrence of application problems, such as nonuniformity of application and streaking on the surface of the liquid applied to the carrier, is increased, thereby lowering the yield or quality of the magnetic tape, disk, or the like.

SUMMARY OF THE INVENTION

Accordingly, it is an object of the present invention to overcome the problems of the prior art by providing an apparatus and method for uniformly cleaning the metering and/or smoothing application-edge surfaces of an application apparatus and the vicinity thereof without the risk of damaging the surfaces of the magnetic layer.

The cleaning apparatus of the present invention is composed of a movement base extending parallel to the longitudinal direction of the application apparatus, as the apparatus applies a magnetic dispersion liquid to a flexible carrier; a mover which is movable on the base; an arm unit which can be moved from the mover over the application-edge surfaces of the application member and be moved vertically relative to the surfaces of the member; and a cleaning head coupled to the armunit at the tip thereof so that the head can be put in elastic contact with the surfaces of the member, wherein the mover is moved on the base as the head is in contact with the surfaces under pressure to automatically clean the surfaces.

BRIEF DESCRIPTION OF THE DRAWINGS

Preferred embodiments of the present invention will be hereinafter described with reference to the appended drawings, wherein.

DESCRIPTION OF THE PREFERRED EMBODIMENTS

Figure 1:
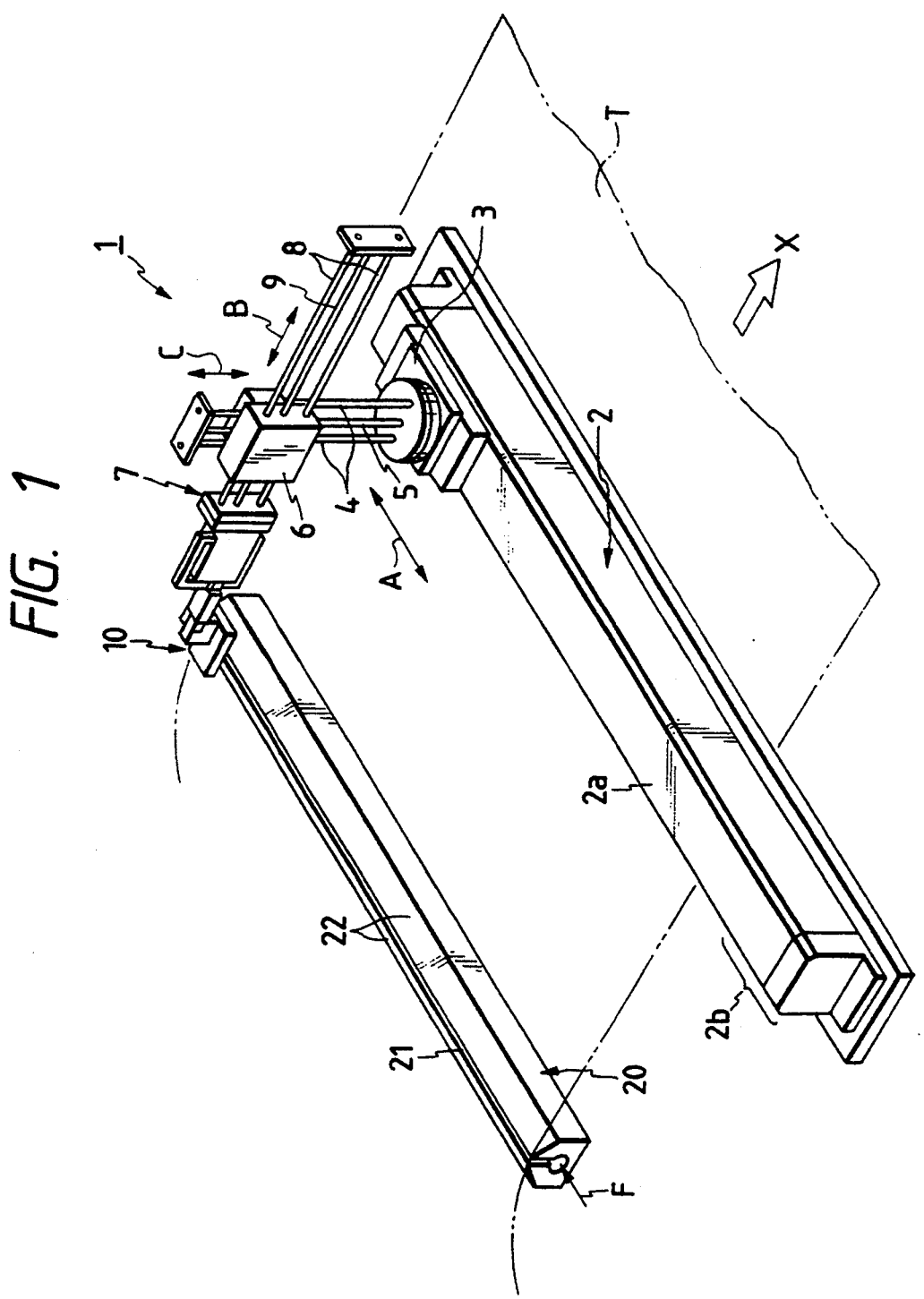
FIG. 1 is a perspective view of an application-edge surface cleaning apparatus in accordance with the present invention.

FIG. 1 is a perspective view of an application apparatus of an extrusion-type application apparatus coupled with a cleaning apparatus 1 constructed in accordance with a preferred embodiment of the invention.

The cleaning apparatus 1 is used to clean the edge surfaces 22 of the application apparatus 20. A magnetic dispersion liquid F is appropriately fed into the reservoir of the application apparatus 20 from a liquid feed system (not shown) so that the liquid is extruded from the slot 21 of the outlet portion of the application apparatus 20 to a flexible carrier T in a manner well known in the art. As a result, the liquid F is applied to the lower surface of the carrier T while the carrier faces the ledge surfaces 22 and is moved in a direction of arrow X.

The cleaning apparatus 1 includes a base 2, a tracer 3, two vertical support rods 4, a pneumatic driver 5, an elevator 6, a traverser 7, two horizontal support bars 8, a pneumatic driver 9, and a cleaning head 10. The tracer 3 is fitted on the upper plate 2a of the base 2 so that the tracer 3 can be traced in a direction parallel with the longitudinal direction of the application apparatus 20 through a prescribed distance between the member 20 and the base 2. The two vertical support rods 4 extend up from the tracer 3. The elevator 6 is guided by the rods 4 so that the elevator 6 can be vertically moved by the pneumatic driver 5. The two horizontal support bars 8 extend horizontally through the elevator 6. The traverser 7 is guided by the bars 8 so that the traverser 7 can be horizontally moved by the pneumatic driver 9. The cleaning head 10 is secured to the traverser 7 at the end portion thereof. The tracer 3 can be moved back and forth in directions of arrow A on the base 2 by a driver (not shown). The elevator 6 can be moved up and down in directions of arrow C by the pneumatic driver 5, while the traverser 7 can be horizontally moved back and forth in directions of arrow B by the other pneumatic driver 9. As a result, the cleaning head 10 can be moved to the edge surfaces 22 of the application apparatus 20 in a vertical, traverse and parallel direction to the elongated application apparatus 20. In other words, the cleaning head 10 can be moved in three-dimensional directions relative to the application-edge surfaces 22 of the application apparatus 20.

Figure 2:
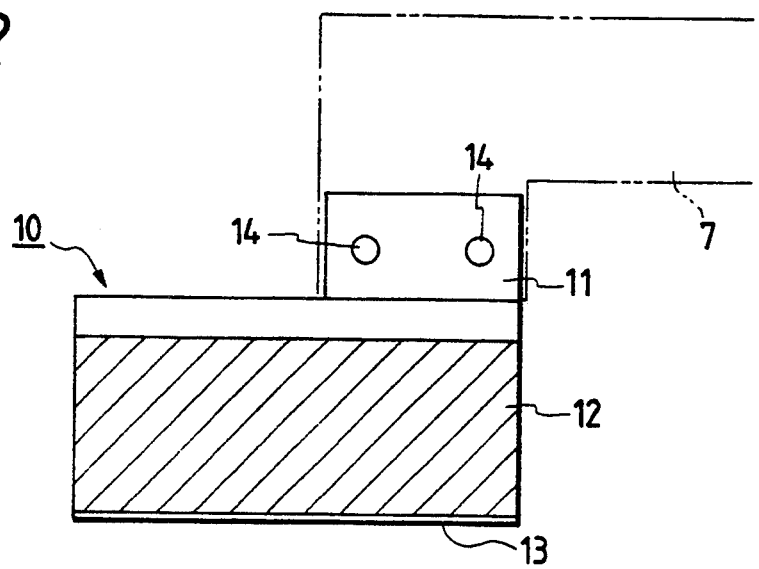
FIG. 2 is a side view of the cleaning head of the apparatus of FIG. 1.
Figure 3:
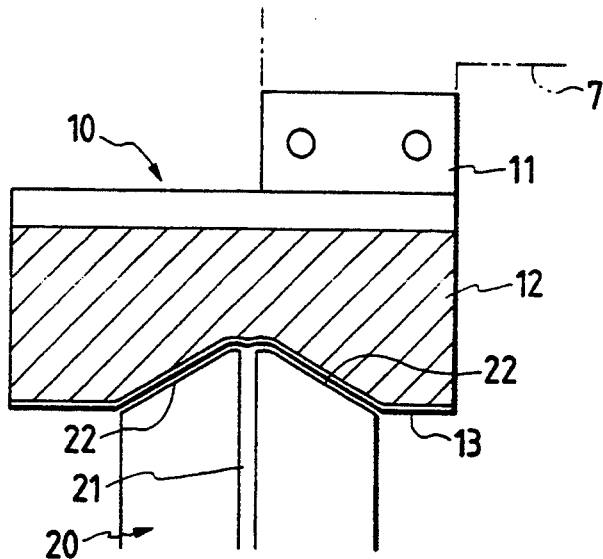
FIG. 3 is a side view of the cleaning head illustrating the contact thereof with application-edge surfaces.

As shown in FIG. 2, the cleaning head 10 includes a fixing portion 11 secured to the traverser 7 at the end portion thereof with screws 14 or the like, an elastic support member 12 made of foam polyethylene resin provided under the fixing portion 1, and a wiper 13 made of a cloth, gauze, or the like, which is provided so as to cover the elastic support member 12. The elastic support member 12 has a density of 50 kg/m$^3$ to 200 kg/m$^3$ or has a compressive hardness of 0.5 kg/cm$^2$ to 2.5 kg/cm$^2$ so that when the cleaning head 10 is put in contact with the edge surfaces 22 under appropriate pressure, the elastic support member 12 is altered or deformed to take the shape of a contour made by the edge surfaces 22, as shown in FIG. 3. By deforming the elastic support member 12 in this manner, the wiper 13 is maintained in uniform contact with the entire edge surfaces 22 under desired pressure. While the wiper 13 is thus kept in contact with the edge surfaces 22, the cleaning head 10 is moved along the total length of the application apparatus 20. As a result, the contaminants or other substances accumulated on the edge surfaces 22 are effectively removed.

If the elastic support member 12 were 50 kg/m$^3$ or less in density, or 0.5 kg/cm$^2$ or less in compressive hardness, the contact pressure of the wiper 13 with the edge surfaces 22 would be too low to uniformly maintain the contact. On the other hand, if the elastic support member 12 were 200 kg/m$^3$ or more in density, or 2.5 kg/cm$^2$ or more in compressive hardness, the contact pressure of the wiper 13 with the edge surfaces 22 would be too high to put the wiper 13 in contact with the entire width of the surfaces 22. The fixing portion 11, the elastic support member 12, and the wiper 13 are integrally stratified or layered together to constitute a single cleaning head 10 so that it can be easily replaced with a new one when necessary.

The cleaning operation of the cleaning apparatus 1 will now be described in detail. When the application apparatus 20 is conducting an application operation, the cleaning head 10 is put aside so that it does not interfere with the normal operation of the application apparatus 20. However, upon completion of the operation, the cleaning head 10 is moved to a prescribed position to conduct a cleaning operation. In particular, the traverser 7 is moved by the pneumatic driver 9 so that the cleaning head 10 is located in a position over the edge surfaces 22 of the application apparatus 20. The elevator 6 is then lowered so that the cleaning head 10 is located so as to come into contact with the edge surfaces 22. The contact pressure can be determined by the air pressure used to move the elevator 6. It is preferable that the pressure be 20 kg/cm$^2$ or more.

After the cleaning head 10 comes into contact with the edge surfaces 22, the tracer 3 is moved on along the base 2 so that the wiper 13 is moved in the direction of arrow A while maintaining contact with the surfaces 22, as shown in FIG. 3. As a result, the contaminants or other substances accumulated on the surfaces 22 are automatically removed by the wiper 13. In accordance with the present invention, the head 10 is moved only once along the total length of the application apparatus 20. As a result, the extraneous substances are effectively removed from the surfaces 22. If the substances remain on the surfaces 22, the movement of the cleaning head 10 along the total length of the head 20 can be repeated a number of times as required to completely remove the substances from the surfaces 22.

As stated above, air pressure is used to move the cleaning head 10 into contact with the surfaces 22. The pressure utilized is easily changed such that the head 10 can be put in soft contact with the edge surfaces 22 of the application apparatus 20, thereby minimizing the risk of damage to the surfaces 22.

Comparative Example

The following comparative example is provided to illustrate the advantages of the present invention over the prior art.

The cleaning apparatus 1 was constructed as follows. The elastic support member 12 of the cleaning head 10 was made of foamed polyethylene of 70 kg/m$^3$ in density and 1.1 kg/cm$^2$ in compressive hardness, the wiper 13 of the head 10 was made of gauze, and the pressure of the air for moving the head 10 down on the surfaces 22 was set at 3.5 kg/cm$^2$·G. The cleaning operation described above was performed using the cleaning apparatus 1 thus constructed. For comparison, the surfaces 22 were also manually cleaned in a conventional manner.

It was observed that a longitudinal streak was formed on the surface of the magnetic layer applied to the carrier after cleaning the surfaces 22. It was found, however, that the frequency in generation of the longitudinal streak was 0.6 to 1 streaks per roll of flexible carrier T after using the cleaning apparatus 1, but the frequency was 0.6 to 2.5 streaks per roll of carrier after the manual cleaning operation. Thus, it should be understood that both the frequency in generation of longitudinal streaks and the degree of fluctuation in the frequency were reduced using the cleaning apparatus 1.

Figure 4:
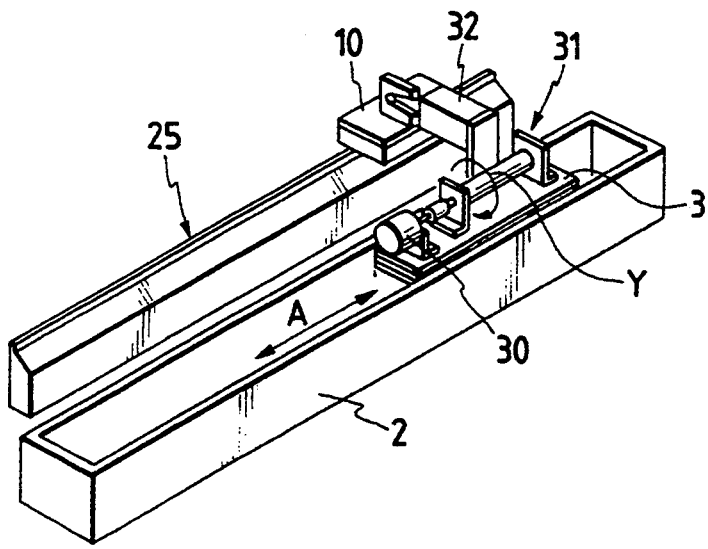
FIG. 4 is a perspective view of an edge surface cleaning apparatus constructed in accordance with the present invention.

The present invention is not confined to the above-described embodiment, but may be embodied or practiced in other various ways without-departing from the spirit or essential character of the device. For example, the drive system of the cleaning apparatus, which is used for moving the cleaning head 10, may be modified as shown in FIG. 4.

In the modification, a rotatable unit 31 having a rotary mechanism, rotatable in a direction of arrow Y perpendicular to directions of arrow A, is provided on a tracer 3 supported on a base 2 so that the mover can be moved in the directions of arrow A. An arm 32 supporting the cleaning head 10 can be rotated about a pivotal axis by a rotary driver 30 of the rotatable unit 31 so that the cleaning head 10 can be easily placed in contact with the desired surface or, alternatively, moved away from the surface. In this example, a cleaning apparatus 1 is used to clean the edge surface of the blade 25 of a blade-type application apparatus. The cleaning head 10 coupled to the rotatable unit 31 at the end portion thereof can be moved in three-dimensional directions to effectively clean the edged surface of the blade 25.

By each of the above-described embodiments, the edge surfaces of the application apparatus or the edge surfaces of the blade can be cleaned automatically. For that reason, the frequency in generation of application defects, such as a streaking, does not fluctuate due to the difference between the cleaning skills of operators who manually clean the edge surfaces. Thus, the quality of the surface of the magnetic layer on the flexible carrier is improved and stabilized through the use of the present invention.

Although pneumatic power is used to move the cleaning head in the above-described embodiments, hydraulic power or electric power may be used instead.

Although a single cleaning head is provided in each of the embodiments described above, it should be noted that a plurality of cleaning heads may be provided, disposed, for example, in parallel or in series with each other along the longitudinal direction of the application apparatus or the blade, with their cleaning surfaces appropriately inclined. Various combinations of such cleaning heads may also be used depending on the surface to be cleaned.

Figure 5:
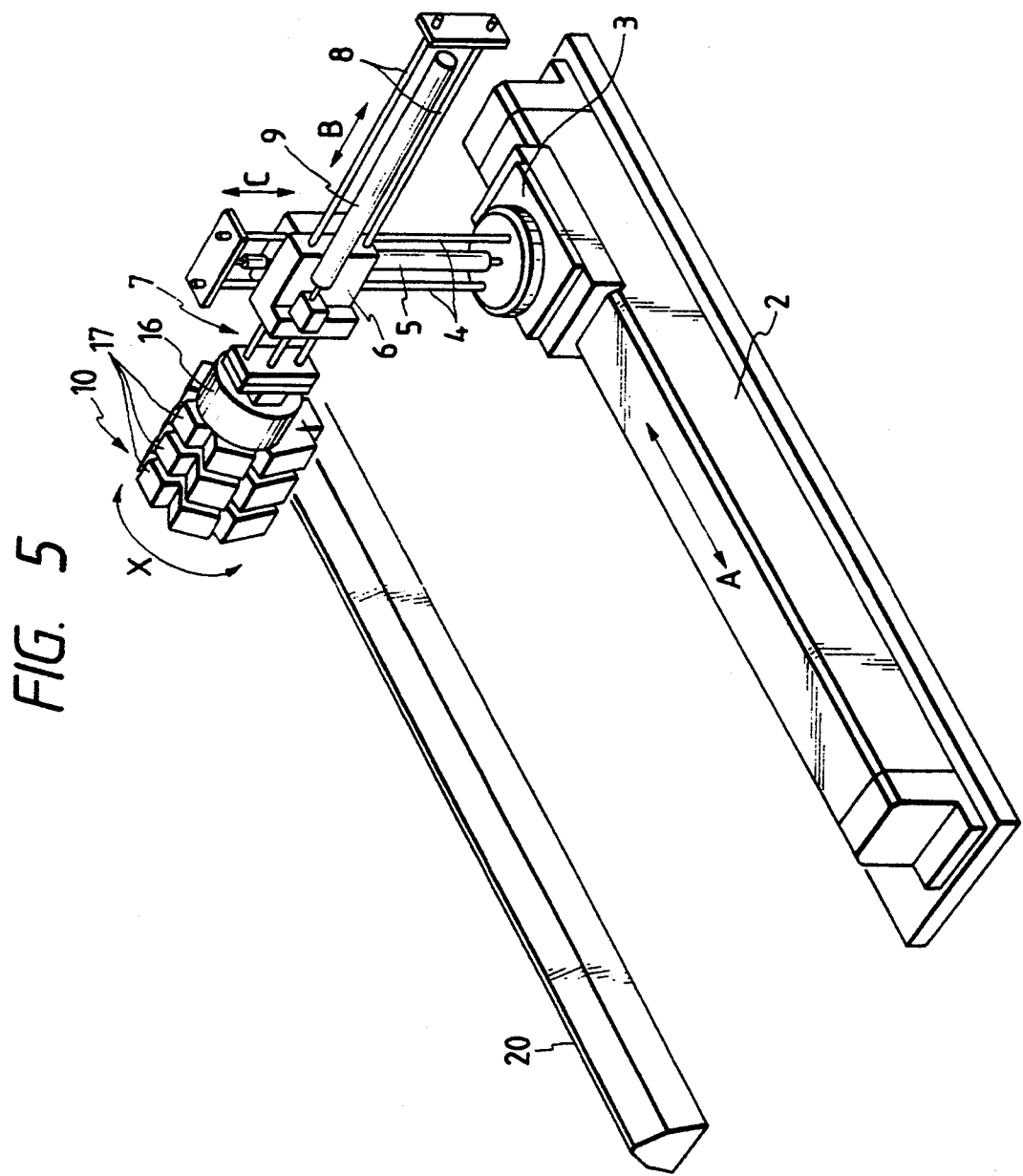
FIG. 5 is a perspective view of an edge surface cleaning apparatus constructed in accordance with another embodiment of the present invention.

FIG. 5 shows a cleaning apparatus constructed in accordance with another embodiment of the invention. The cleaning apparatus of this embodiment is used to clean the edge surface of the blade 20 of a blade-type application apparatus. In this embodiment, a cleaning head 10 is divided into eighteen cleaning surfaces 17. In addition, a stepping motor 16 is provided for rotating the cleaning head 10 to a prescribed position in each of directions of arrow X. It is preferable that the motor 16 be driven by the pressure of air, oil, or the like. The movement of the cleaning head 10 in directions of arrow B by the pneumatic driver 9 can be stopped in any desired position by application of a halfway stopping brake or the like (not shown).

Figure 6:
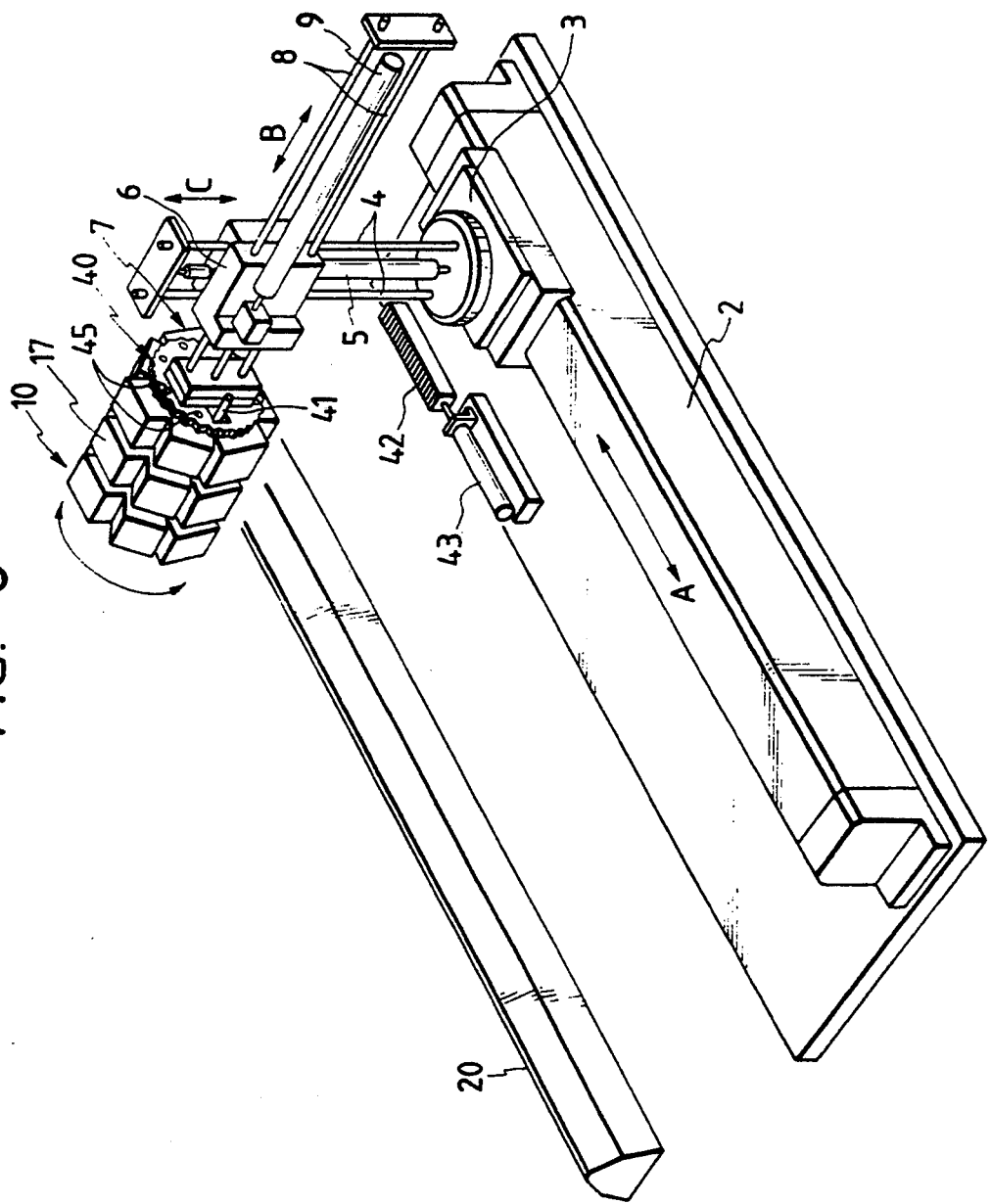
FIG. 6 is a perspective view of an edge surface cleaning apparatus constructed in accordance with yet another embodiment of the present invention.

FIG. 6 shows a cleaning apparatus constructed in accordance with yet another embodiment of the present invention. As in FIG. 5, the cleaning apparatus of FIG. 6 is used to clean the edge surface of blade 20 of a blade-type application apparatus. This cleaning apparatus, however, has a pinion 40 for rotating the cleaning head 10, a positioning cylinder 41 for securing the gear in any desired position, a rack 42, mounted at the end of the base 2, for engaging the spur gear 40, and a cylinder 43 for moving the rack 42 to rotate the pinion 40. The pinion 40 has a plurality of holes 45 which may receive the cylinder 43 to secure the cleaning surfaces 17 after the cleaning head 10 has been rotated to a desired position.

The cleaning head 10 can be rotated through a prescribed angle by lowering the cleaning head 10 using the elevator 6 and adjusting the arm 7 such that the pinion 40 engages the rack 42 at the end of the basement 2. A cylinder 43 is used to move the rack 42 in a longitudinal direction, thereby rotating the pinion 40. The stroke of the cylinder 43 and the rack 42 is long enough to rotate the cleaning head 10 through a prescribed angle.

In the alternative, the cylinder 43 may be eliminated by securing the rack 42 to the end of the tracer 3. In this manner, the tracer 3 can be used to move the rack 42 while it is engaged with the pinion 40 to rotate the cleaning head 10.

Although the number of cleaning surfaces of each of the cleaning heads 10 shown in FIGS. 5 and 6 is eighteen, the number may be any appropriate number in accordance with the application at hand. Although the cleaning heads are illustrated as rectangular in shape, the cleaning heads 10 may be cylindrically shaped to have a cylindrical peripheral cleaning surface.

Moreover, the single swingable arm unit shown in FIG. 4 can be replaced by a plurality of such arm units to be alternately used for cleaning.

Although each of the cleaning apparatuses shown in FIGS. 1-6 is provided separately from the application apparatus 20 or the blade 20, the apparatus may be integrated with the member or the blade without departing from the present invention.

What is claimed is:

1. A cleaning apparatus for removing foreign matter from an elongated application apparatus which applies a dispersion liquid to a flexible carrier, comprising:
    an elongated base positioned substantially parallel to a longitudinal axis of said application apparatus;
    a cleaning head for removing said foreign matter from said application apparatus;
    first moving means for moving said cleaning head in a direction parallel to said base, said first moving means being mounted to said base and supported by said base; and
    second moving means for moving said cleaning head in a direction towards and away from said application apparatus so as to move said cleaning head into and out of contact with said application apparatus, said second moving means being mounted on said first moving means, and said cleaning head being mounted on said second moving means;
    wherein said cleaning head wipes foreign matter from said application apparatus while said cleaning head is being moved in said direction parallel to said base after said cleaning head has been moved into contact with said application apparatus by said second moving means.

2. The cleaning apparatus of claim 1, wherein each of said first and second moving means comprises at least one pneumatic driver.

3. The cleaning apparatus of claim 1, wherein said cleaning head comprises:
    an elastic support member; and
    a wiper, which is provided so as to cover said elastic support member, wherein said elastic support member is deformed to take similarly the shape of said application apparatus when said cleaning head comes in contact with said application apparatus, said wiper maintaining contact with said application apparatus as the cleaning head is moved along said application apparatus so as to remove the foreign matter residing on said application apparatus.

4. The cleaning apparatus of claim 1, wherein said second moving means comprises a rotary driver, coupled to said cleaning head and said first moving means, for moving said cleaning head into a position of contact with said application apparatus by rotating about a pivotal axis of said rotary driver.

5. The cleaning apparatus of claim 1, wherein said cleaning head has a plurality of cleaning surfaces.

6. The cleaning apparatus of claim 5, wherein said second moving means comprises a rotating device, coupled to said cleaning head, for rotating said cleaning head such that at least one of said plurality of cleaning surfaces comes into contact with said application apparatus.

7. The cleaning apparatus of claim 6, wherein said rotating device comprises a stepping motor.

8. The cleaning apparatus of claim 5, wherein said rotating device comprises:
    a pinion, coupled to said cleaning head, rotating said cleaning head as said pinion is rotated; and
    a rack causing said pinion to rotate.

9. The cleaning apparatus of claim 8, wherein said second moving means comprises a cylinder, coupled to said rack and said first moving means, for moving said rack so as to cause said pinion to rotate when said pinion is engaged with said rack.

* * * * *